(12) United States Patent
Yagnik et al.

(10) Patent No.: US 8,213,689 B2
(45) Date of Patent: Jul. 3, 2012

(54) METHOD AND SYSTEM FOR AUTOMATED ANNOTATION OF PERSONS IN VIDEO CONTENT

(75) Inventors: Jay Yagnik, Mountain View, CA (US); Ming Zhao, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 959 days.

(21) Appl. No.: 12/172,939

(22) Filed: Jul. 14, 2008

(65) Prior Publication Data
US 2010/0008547 A1    Jan. 14, 2010

(51) Int. Cl.
*G06K 9/00* (2006.01)
*G06K 9/62* (2006.01)
(52) U.S. Cl. .......... 382/118; 382/225
(58) Field of Classification Search .......... 382/118, 382/209, 218, 225, 278
See application file for complete search history.

(56) References Cited

U.S. PATENT DOCUMENTS

| | | | |
|---|---|---|---|
| 6,272,231 B1 | 8/2001 | Maurer et al. | |
| 6,795,567 B1 | 9/2004 | Cham et al. | |
| 7,146,028 B2 * | 12/2006 | Lestideau | 382/118 |
| 7,308,133 B2 * | 12/2007 | Gutta et al. | 382/159 |
| 7,881,505 B2 * | 2/2011 | Schneiderman et al. | 382/118 |
| 2007/0296863 A1 * | 12/2007 | Hwang et al. | 348/563 |
| 2008/0080743 A1 | 4/2008 | Schneiderman et al. | |

FOREIGN PATENT DOCUMENTS
WO    WO 2007/036892 A1    4/2007

OTHER PUBLICATIONS

Zhao et al., "Large Scale Learning and Recognition of Faces in Web Videos," The 8th IEEE International Conference on Automatic Face and Gesture Recognition , Sep. 2008, 7 pages.
Fergus, et al., "Learning object categories from Google's image search," ICCV, 2005, 8 pages.
Fergus, et al., "A visual category filter for Google images," Proc. ECCV, 2004, 14 pages.
Zhao, et al., "Face Recognition: A Literature Survey," ACM Computing Surveys, 2003, 61 Pages.
Phillips, et al., "FRVT 2006 and ICE 2006 Large-Scale Results," Mar. 29, 2007, 55 pages.
Berg, et al., "Names and faces in the news," CVPR, 2004, 7 pages.
Fitzgibbon, et al., "On Affine Invariant Clustering and Automatic Cast Listing in Movies," European Conference on Computer Vision, 2002, 17 pages.

(Continued)

*Primary Examiner* — Daniel Mariam
(74) *Attorney, Agent, or Firm* — Sterne, Kessler, Goldstein & Fox PLLC

(57) ABSTRACT

Methods and systems for automated annotation of persons in video content are disclosed. In one embodiment, a method of identifying faces in a video includes the stages of: generating face tracks from input video streams; selecting key face images for each face track; clustering the face tracks to generate face clusters; creating face models from the face clusters; and correlating face models with a face model database. In another embodiment, a system for identifying faces in a video includes a face model database having face entries with face models and corresponding names, and a video face identifier module. In yet another embodiment, the system for identifying faces in a video can also have a face model generator.

20 Claims, 8 Drawing Sheets

OTHER PUBLICATIONS

Leung, et al., "Finding Faces in Cluttered Scenes using Random Labeled Graph Matching," Int. Conf Computer Vision, 1995, 8 pages.
Barnard, et al., "Matching Words and Pictures," Journal of Machine Learning Research, vol. 3, 2003, pp. 1107-1135.
Edwards, et al., "Words and Pictures in the News," Workshop on Learning Word Meaning from Non-Linguistic Data, 2003, 8 Pages.
Ramanan, et al., "Leveraging archival video for building face datasets," Int'l Conf. on Computer Vision, Oct. 2007, 8 Pages.
Stallkamp, et al., "Video-based Face Recognition on Real-World Data," International Conference on Computer Vision (ICCV'07), Rio de Jenario, Brasil, Oct. 2007, 8 Pages.
Viola, et al., "Robust real time object detection," IEEE ICCV Workshop on Statistical and Computational Theories of Vision, Vancouver, Canada, Jul. 13 2001, 25 Pages.
Everingham, et al., "Hello! My name is . . . buffy—automatic naming of characters in tv video," Proceedings of the British Machine Vision Conference, 2006, 10 Pages.
Sivic, et al., "Person spotting: video shot retrieval for face sets," International Conference on Image and Video Retrieval, 2005, 10 Pages.
Shen, et al., "Personal name classification in web queries," WSDM '08: Proceedings of the international conference on Web search and web data mining, 2008, pp. 149-158.
Hadid, et al., "From Still Image to Video-Based Face Recognition: An Experimental Analysis", IEEE International Conference on Automatic Face and Gesture Recognition, 2004, pp. 813-818.
Yagnik, J., U.S. Appl. No. 11/840,139, filed Aug. 16, 2007, entitled "Graph Based Sampling".
Yagnik, J., U.S. Appl. No. 11/566,075, filed Dec. 1, 2006, entitled "Identifying Images Using Face Recognition".
International Search Report cited in Application No. PCT/US2009/004061, dated Oct. 16, 2009.
Written Opinion of the International Searching Authority cited in Application No. PCT/US2009/004061, dated Oct. 16, 2009.

* cited by examiner

METHOD AND SYSTEM FOR AUTOMATED ANNOTATION OF PERSONS IN VIDEO CONTENT

BACKGROUND

This invention relates to recognizing persons in video content.

BACKGROUND ART

The Internet hosts vast amounts of content of different types including text, images, and video. Leveraging this content requires that the content is searchable and organized. Images are generally searched and organized based on tags that are manually assigned by users. Similarly, video content is generally searched and organized based on tags that are manually assigned.

However, it is impractical to maintain consistency when manually assigning tags to the large amounts of video content available on the Internet. For example, each video may be of substantial length and may include many persons appearing in different parts of the video. The video may vary according to pose, expression, illumination, occlusion, and quality. It would require a substantial amount of manual effort to accurately tag the video with the name of each person appearing in the video. The manual approach of tagging content is not scalable to the large amount of content available on the internet.

Current approaches to general object recognition include, using an image search engine to find images relevant to a given query and then learn relevant models for various objects that are then used for object detection/recognition in images and in video. However, these approaches do not address the substantial variations that can be presented by the face of a single person in a large data set, and cannot robustly recognize a face belonging to the same person but having substantial variation due to aspects including age, makeup, expression, light conditions, etc. Other approaches automatically extract discriminant coordinates for faces and apply a clustering step to estimate likely labels using news archives. However, clustering directly based on discriminant coordinates for faces does not address issues of noise occurring in sequences of images.

Therefore, what are needed are methods and systems to automatically annotate video content based on faces of persons appearing in the video.

SUMMARY

In one embodiment, a computer-implemented method that identifies faces in a video includes the stages of: generating one or more face tracks from an input video stream; selecting key face images for each of the one or more face tracks; clustering the face tracks to generate face clusters, where each face cluster is associated with one or more key face images; creating face models from the face clusters; and correlating face models with a face model database.

In another embodiment, a system for identifying faces in a video includes the components: a face model database having face entries with face models and corresponding names; and a video face identifier module. The video face identifier module can include: a face detection module that detects faces in an input video stream; a face tracking module that tracks detected faces and generates face tracks; an intra-track face clustering module; an inter-track face clustering module; a detected face model generator module; and a model comparison module that compares detected face models with face entries in a database.

In yet another embodiment, a system for identifying faces in a video includes a face model generator having as components: a name generating module that generates a name list; an image searching module that locates images corresponding to the name list; a face detection module; a face model generation module; a collection module that pair-wise stores the one or more face models and the corresponding names; and a consistency learning module. In addition to the detected face model and name pairs, the collection module may also store face model and name pairs derived from user input.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF EMBODIMENTS

While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

Increasingly larger collections of video are becoming available with the proliferation of content spurred by the widespread availability of video recording devices and the connectivity offered by the Internet. Through the use of interconnected networks and shared video collections, at any instant, a single user may have access to large collection of video content on various subjects authored by persons spread throughout the world. To leverage the information contained in these large collections, it is necessary that the collections are structured in a manner that facilitates searching. A system that can automatically annotate these large collections of video with information, such as, for example, names of persons appearing in the video would be useful. The methods and systems in this disclosure make use of large text and image corpora available, for example, on the Internet, to automatically associate names and faces with minimal manual intervention, and then to derive a set of face models used for robust recognition of faces in video content. The derived set of models can be used for automatic recognition and annotation of video content to make the video content more searchable. Models may be developed, for example, for celebrities or other popular people for whom there is sufficient information available to make an association.

System Components

Figure 1:
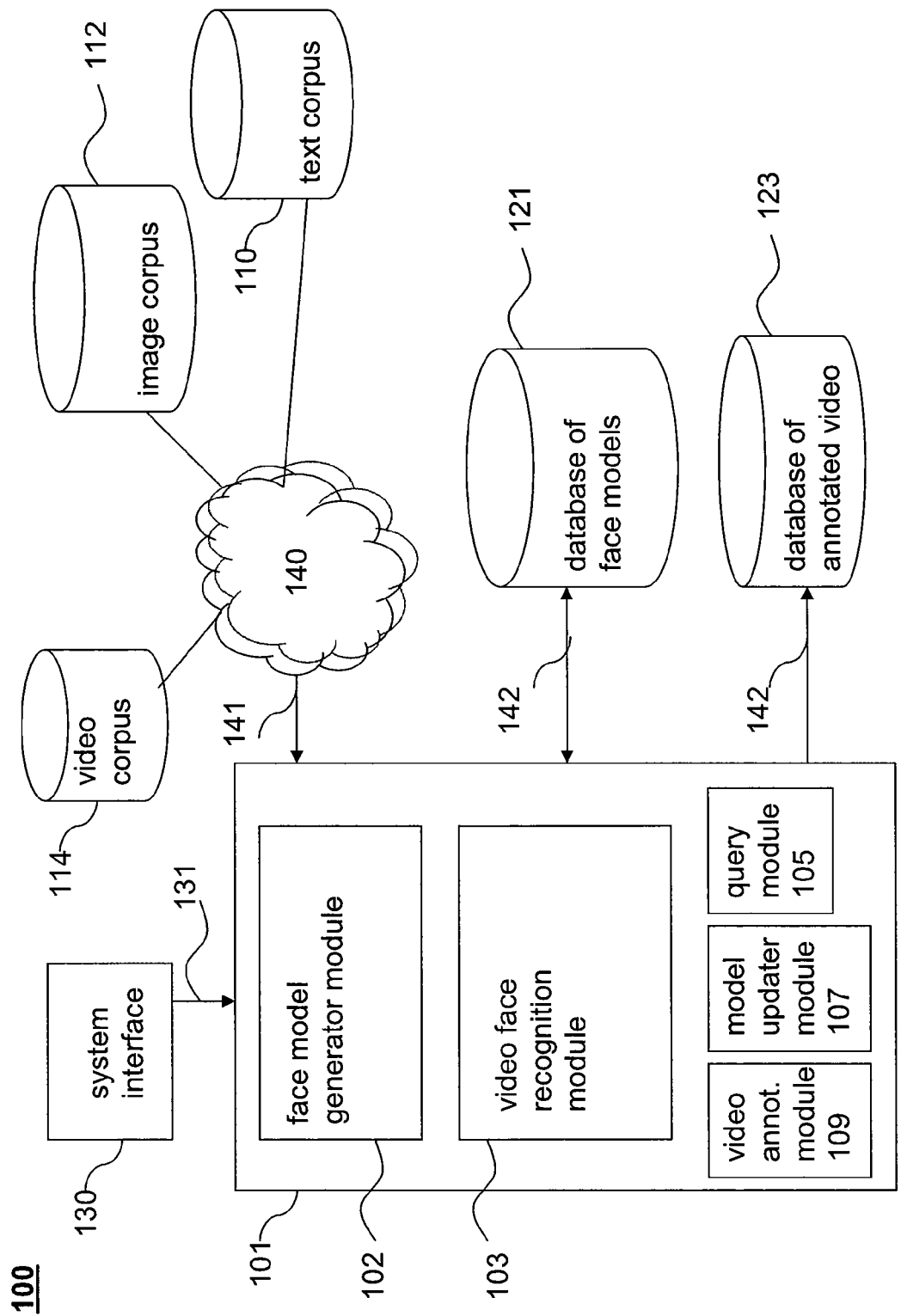
FIG. 1 is a system view according to one embodiment of the present invention.

FIG. 1 shows a system 100 that can automatically annotate a video, according to an embodiment of the present invention, with information, such as, for example, names of popular persons who appear in the video. A video processor module 101 is coupled to a system interface 130 with a connection device 131. System interface 130 may be a user interface or an application programming interface located on the same computing platform as video processor module 101, or a remote user interface, such as, for example, a web client. Accordingly, connection device 131 may use a connection method, such as, for example, a Peripheral Component Interconnect (PCI) bus, Ethernet, or a wireless communication standard.

Video processor module 101 can also access a video corpus 114, an image corpus 112, and a text corpus 110. Some or all of corpora 114, 112, and 110, may be accessible through a network 140, such as, for example, a wide area network (WAN) like the Internet or a local area network (LAN), or may be located locally on a user's own system. Corpora 114, 112 and 110 may each include one or more corpora that are co-located or distributed. In some embodiments, corpora 114, 112 and 110, may be co-located in part or in whole. Video processor module 101 may be coupled to network 140 through any connection 141 including for example and without limitation, a PCI bus, Ethernet, and a wireless communication standard. Video corpus 114 may include video clips of any length and in any video format including, for example and without limitation, any Moving Picture Experts Group (MPEG) standard, audio video interleave standard (AVI), QuickTime, and Windows Media Video (WMV). The video clips include videos having one or more persons. Image corpus 112 may include images in any image format, such as, JPEG, TIFF, and PNG. Image corpus 112 includes images of persons. Text corpus 110 includes, for example, text archives accessible locally and/or over the Internet. Available text archives may include, for example and without limitation, ASCII text, PDF text, and other forms of text.

Video processor module 101 is also coupled to a database of face models 121 and a database of annotated video 123, over connections 142. Database of face models 121 includes face models generated by the video processor module 101 based at least partly on images available in the image corpus 112. Such generation of face models will be further described with respect to FIG. 5, below. Database 121 may include one or more face models for each person represented. It may also include additional information, such as names or other tags attached to the person or facial images of the person. Database of annotated video 123 includes video, primarily from video corpus 114, annotated during the processing in video processor module 101. As used in this disclosure, "database" refers to any collection of data elements, and associated storage and access mechanisms. Connections 142 may use one or more connection methods, such as, for example, a PCI bus, Ethernet, and wireless communications standards.

Video processor module 101 can include several components, including a face model generator module 102, a video face recognition module 103, a video annotator module 109, a model updater module 107, and a query module 105. Video processor module 101 and some or all of the sub-modules 102, 103, 105, 107, and 109 may be implemented in software, hardware or any combination thereof. For example, model generator module 102 may be implemented as executable code on a central processor unit (not shown in FIG. 1). In another embodiment, model generator module 102 may be implemented in a hardware component such as a Field Programmable Gate Array. A person skilled in the art would understand that video processor module 101 may be implemented in one or more platforms.

Face model generator module 102 may build models of faces that are selected from images in image corpus 112 and video corpus 114. Module 102 may also determine a set of people whose facial images are to be modeled. For example, in an embodiment, text corpus 110 is analyzed to derive a list of most popular persons and locate one or more images of the faces of each of them. A news archive may be a combined text corpus 110 and image corpus 112, and an analysis of the frequency of occurrence of person names in the news archive can generate a list of most frequently occurring names. Many of the most frequently occurring names may be associated with an image having the face of the named person in one or more news articles, and can therefore be used as a starting point to get models of the facial images of those named people. Face models derived from these and other matched images from image corpus 112 and video corpus 114 can then be stored in database of face models 121.

Video face recognition module 103 uses face models including face models from database of face models 121 to detect and recognize faces from video corpus 114. Recognition of faces in video streams is explained in more detail with respect to FIG. 7 and FIG. 8 below. As faces are detected and recognized in the video streams of video corpus 114, module 103, together with video annotator module 109, can annotate the video with information known about the person whose face is being recognized. For example, names and tags in database 121 associated with a corresponding image may be used for the annotation. The annotated video, or part thereof, can then be stored in database of annotated video 123.

In some embodiments of the present invention, a model updater module 107 can be used to update face models in database 121 based on new additions to the image corpus 112 and video corpus 114. It may also update face models in database 121 by adding faces that are recognized by video face recognition module 103. Updating available face models in database 121 according to an increasing number of images may increase the reliability of face recognition for persons having multiple images covering a range of postures, lighting conditions, etc. Also, in some embodiments, a query module 105 may be used for leveraging the video information in annotated video database 123. For example, query module 105 may collaborate with external modules to search for a set of video clips or parts of video clips that include an appearance of a specified person, and make those video clips available for access by the external modules. In this manner, for example, a standard browser search for a specific person can be enhanced to present video tracks having at least one appearance of the specified person.

Figure 2:
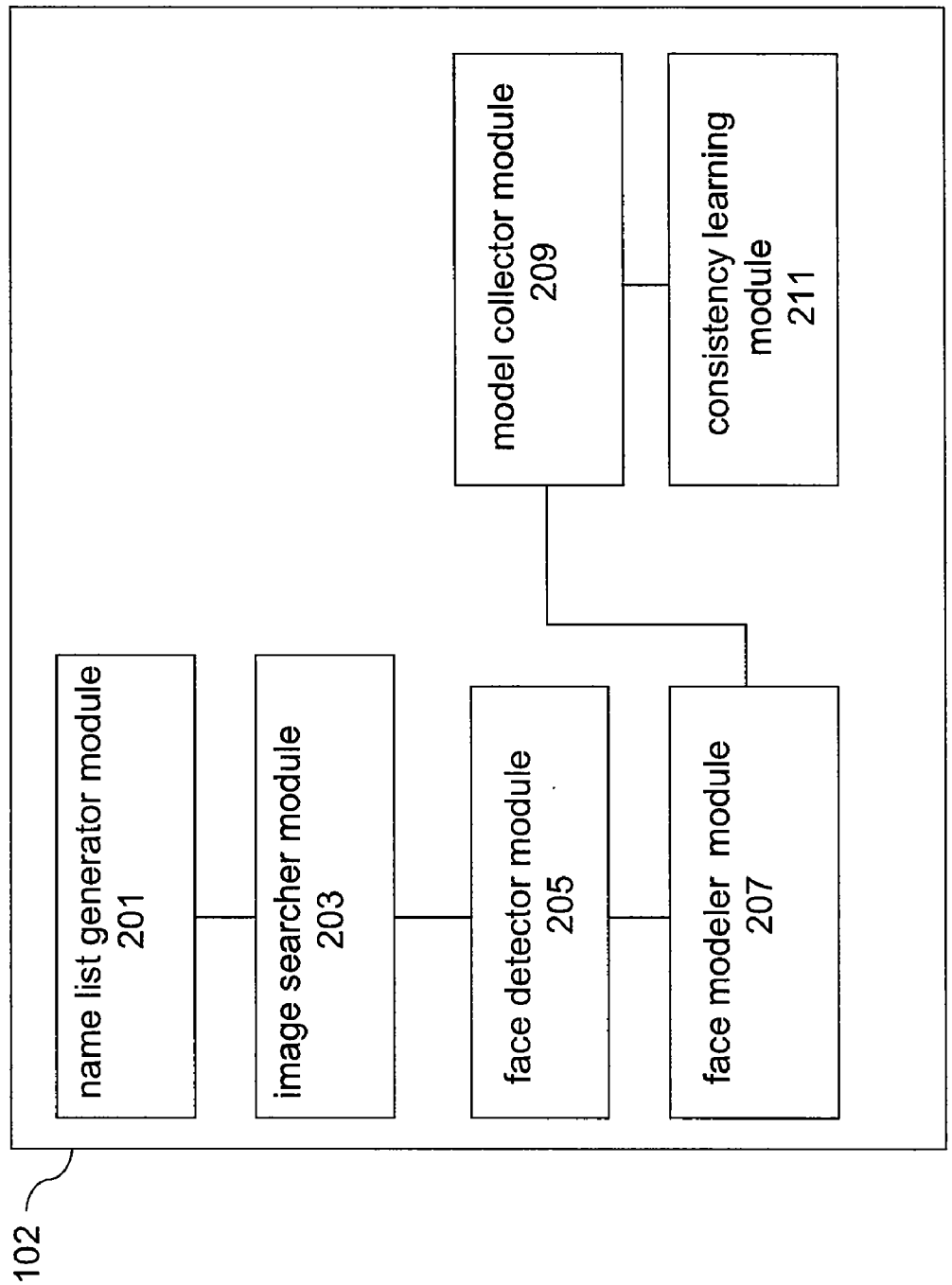
FIG. 2 shows components of a face model generator module according to an embodiment of the present invention.

FIG. 2 shows components of face model generator module 102. A name list generator module 201 acquires a list of persons for whom face models will be generated and stored in database of face models 121. For example, name list generator module 201 may access external text corpora, for example, text corpus 110, to determine a list of most frequently occurring names. An image searcher module 203 associates at least one image with each name in the list of names generated by module 201. For example, one or more images in image corpus 112 may be a part of a newspaper article about a celebrity whose name is on the list of names generated by module 201. The inclusion of the image with the article provides an association detected by image searcher module 203. Using a list of names of persons of interest and images associated with those names, face detector module 205 processes each image to detect a face corresponding to the associated name. A face modeler module 207 creates one or more face models from the one or more faces detected that correspond to a single name. A model collector module 209 gathers all face models corresponding to the same person. A consistency learning module 211 selects one or more face models for each associated name, and filters out the face models that are considered weak matches.

Returning to FIG. 1, face model database 121 contains one or more face models per person that is included in the database. The use of multiple models in face recognition increases the accuracy of the system. Multiple face models can represent different appearances of the same person, different light conditions, different environments, etc. A very large variation in facial expressions, facial accessories, age, light conditions, etc., can be expected for the face of the same person in a large collection of image and video content. Associated with each face model, and/or each group of face models for the same person, can be one or more tags including the person's name.

Figure 3:
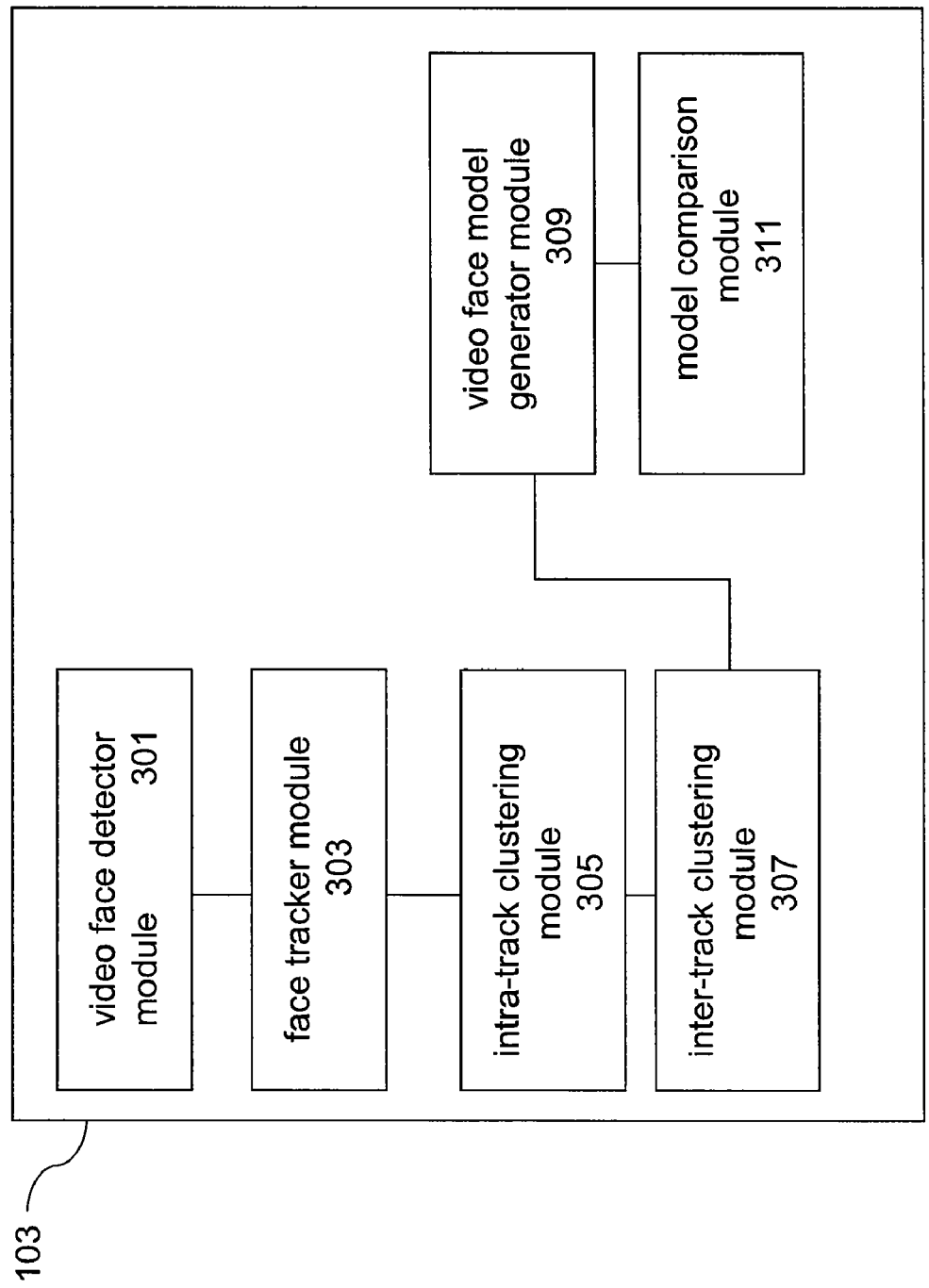
FIG. 3 shows components of a video face recognition module according to an embodiment of the present invention.

In FIG. 3 components of video face recognition module 103 are shown according to an embodiment of the present invention. Video face detector module 301 detects faces in an incoming video. After detector module 301 detects a face, a face tracker module 303 tracks that face in the incoming video stream. Face tracker module 303 can create one or more tracks for each face that is detected by module 301 and then tracked by module 303. An intra-track clustering module 305 then processes the generated tracks to create face clusters based on each track. For example, if the face of a single person undergoes substantial variations in appearance due to facial expressions, facial accessories such as sunglasses, different light conditions, etc., then multiple face models may be required to capture the face accurately because of its many variations even in the duration of the single track. Intra-track clustering module 305 collects one or more facial images for each face that is tracked in each video track according to the level of variation detected in a particular face. An inter-track clustering module 307 creates clusters using the intra-track clusters of facial images. Inter-track clustering module 307 can combine similar clusters from separate tracks, to create one set of face image clusters for each person detected in the video.

Taking as input the facial image clusters generated by inter-track clustering module 307, a video face model generator module 309 generates face models corresponding to the selected one or more images for each person. The new face models that are generated can be stored in, for example, database of face models 121. For example, having multiple face models encompassing a variety of expressions, lighting conditions, etc., generally makes it easier to reliably detect the occurrence of a face in a video or image corpus. A model comparison module 311 takes the newly generated face models, and may determine whether it would be beneficial to store the additional models. Module 311 matches the newly generated face models to one or more models stored in database 121, and thereby associates the newly generated face models with one or more tags stored in database 121 including, possibly, a person's name. Having associated a newly detected face with information previously stored in database 121, module 311 may facilitate an annotation module 109 to annotate the video track or segment with data such as the name of the associated person, and/or other information contained in the tags. The annotated video may be stored in a database of annotated video 123. As new face models are added to database of facial models 121, verification and filtering algorithms such as, for example, consistency learning algorithms can be used to create or update face models.

Generating and Updating Face Models

Figure 4:
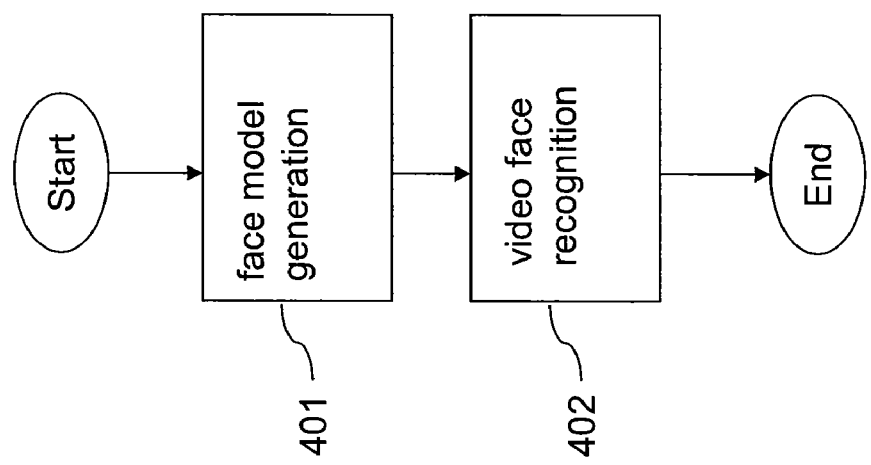
FIG. 4 shows a high level flowchart of a computer-implemented method implementing an embodiment of the present invention, including a model building stage and a video face recognition stage.

FIG. 4 is a flowchart showing two major processing stages according to an embodiment of the present invention. A face model generation stage 401 includes building and updating a database of face models, such as database 121. A video face recognition stage 402 includes using an existing face model database to detect and recognize faces in video. An embodiment of face model generation stage 401 is further dissected into component stages shown in FIG. 5. Stage 401 can be implemented using components including those shown in FIG. 2. An embodiment of video face recognition stage 402 is further dissected to component stages shown in FIG. 7. Stage 402 can be implemented using components, including those shown in FIG. 3.

Figure 5:
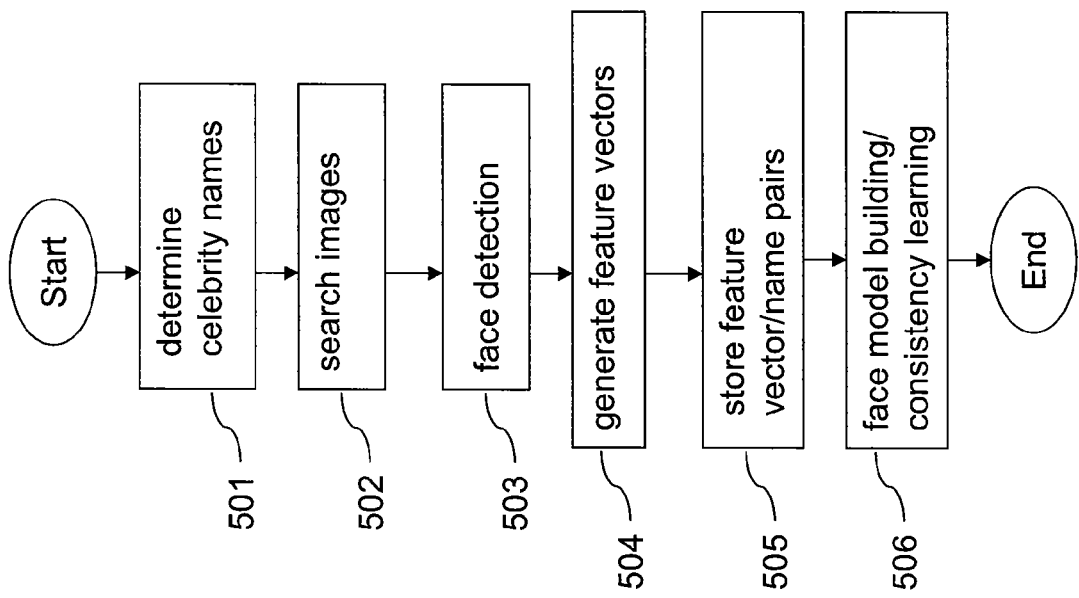
FIG. 5 shows more detailed operation of the model generation stage of FIG. 4, according to an embodiment of the present invention.

FIG. 5 is a flowchart illustrating exemplary processing stages in creating a database of face models, according to an embodiment of the present invention. In stage 501, a set of names is determined, where for each name, stage 401 will attempt to determine one or more corresponding face models and store those face models in a database, such as database of face models 121. The list of names may be determined based on such criteria as names most frequently occurring in text and image corpora, such as, for example, current news archives. Such a selection criteria may generally yield a list of most popular names, such as, for example, celebrities. The automatically generated list of names may be manually or programmatically edited to add new names, to delete existing names, or to modify existing names. For example, in one embodiment, names of a user's closest friends can be added to the list of names. Text analysis methods for determining most frequently occurring names in a collection of sources are well known in the art.

In stage 502 image corpus 112 is searched to gather multiple images associated with each of the names in the name list. As stated earlier, embodiments of the present invention may operate with fully or partially integrated text and image corpora. For example, image captions or articles in which images are embedded can be used to obtain a substantially unambiguous association between a name and an associated image. In embodiments of the present invention, an association can be assumed between a name and an image, such as, the association of a name appearing frequently in a news article with an image appearing in the same article. Loose associations between a name and an image, such as in the above described news article, for example, can in general be considered weak and noisy text-image correlation data. As the size of the corresponding text corpus increases relative to the size of the image corpus, it becomes more difficult to reliably correlate a name to an image. However, the size and diversity of text and image corpora such as what is accessible on the Internet, allows the use of these weak and noisy associations as initial estimates of facial image to name associations.

In stage 503, face detection is performed for each image found in stage 502. Methods of face detection in images are well known in the art. Where an image yields only one detected face, the association between the detected face and the corresponding name may be unambiguous. When an image yields multiple detected faces, in some embodiments of the present invention, an association may be assumed between the corresponding name and each detected face. The resolution of the associations to a single person can be left to, for example, stage 506. In some embodiments, images having more than a predetermined number of detected faces may be excluded from being used for purposes of this invention. In some embodiments, methods such as correlating the most prominent facial image with the most frequently occurring name in the corresponding document may be used. A person of skill in the art will understand that there are multiple ways in which to form a loose initial association between a name appearing in a text sample and a corresponding image. In one embodiment of the present invention, a user may provide one or more images including the face of a person, and a corresponding name or text label. These user provided image and name pairs may also be added to the face database for further processing.

For each face that is detected in stage 503, one or more feature vectors are generated in stage 504. Feature vectors describe specific properties of a detected face, such that comparison of two facial images is possible using the corresponding feature vectors. Methods of generating feature vectors for a facial image are known in the art. For example, searching of image corpora for named persons and processing the images that are found is described in U.S. Patent Application Publication No. 2008/0130960 titled "Identifying Images Using Face Recognition," which is hereby incorporated by reference in its entirety.

Figure 6:
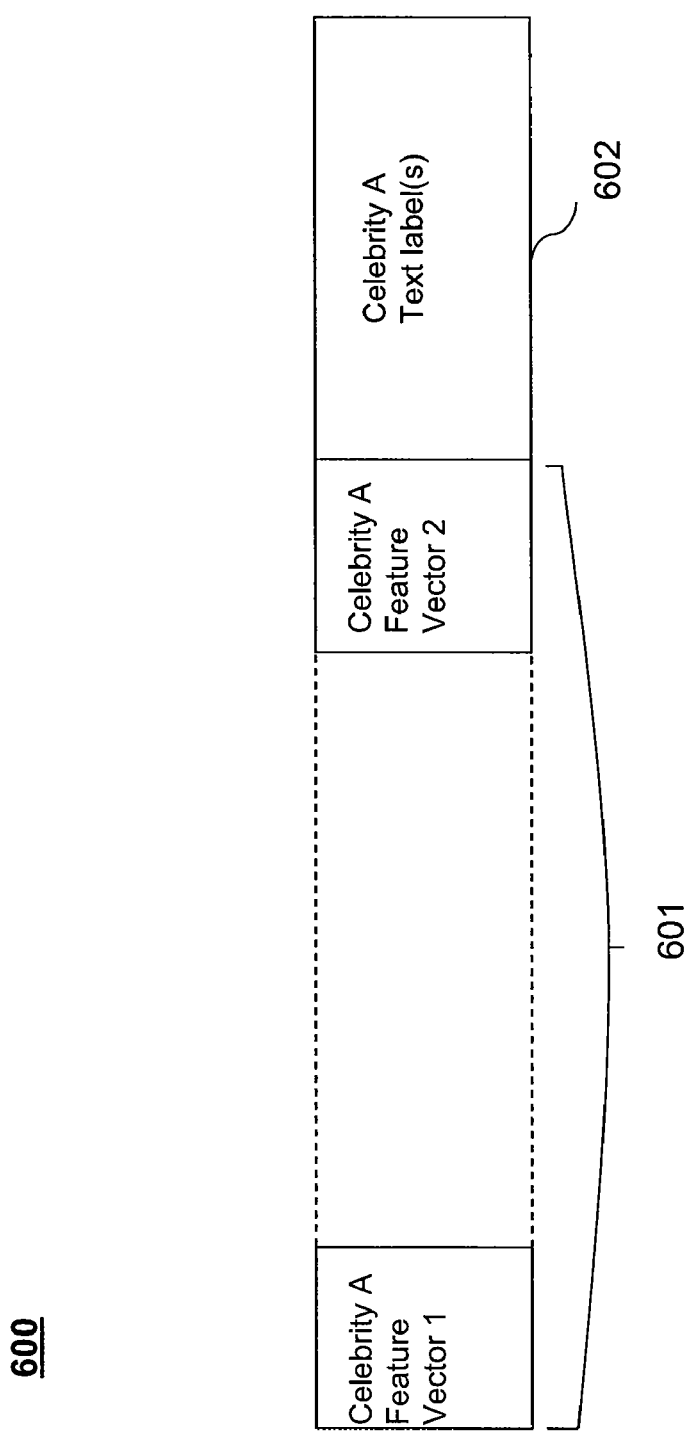
FIG. 6 shows a structure of a face model entry corresponding to one person, according to an embodiment of the present invention.

In stage 505, the feature vectors are stored in association with the corresponding person name. For example, feature vectors and corresponding name pairs, including other associated tag information can be stored in a database, such as database of facial images 121. FIG. 6 illustrates an example of an entry in database of facial images 121 in one embodiment of the present invention. For a particular person A, all feature vectors 601 representing the facial images of the person may be associated with text labels or tags including the name associated with that person A. A person skilled in the art will understand that other forms of storing the data are possible.

In stage 506, feature vectors for a specific person are processed to reduce to a set of face models and/or feature sets that can reliably be considered as belonging to that specific person. The number of face models retained for each person is variable, and primarily depends on the variation in conditions of the images such as facial expressions, age, facial accessories, lighting conditions, etc. In some embodiments of the present invention, a bagging technique such as consistency learning is applied to distil a suitable set of face models for each represented person. Consistency learning is described in detail in U.S. patent application Ser. No. 11/840,139 titled "Graph Based Sampling," which is hereby incorporated by reference in its entirety.

Detecting and Tracking Faces in Video

Figure 7:
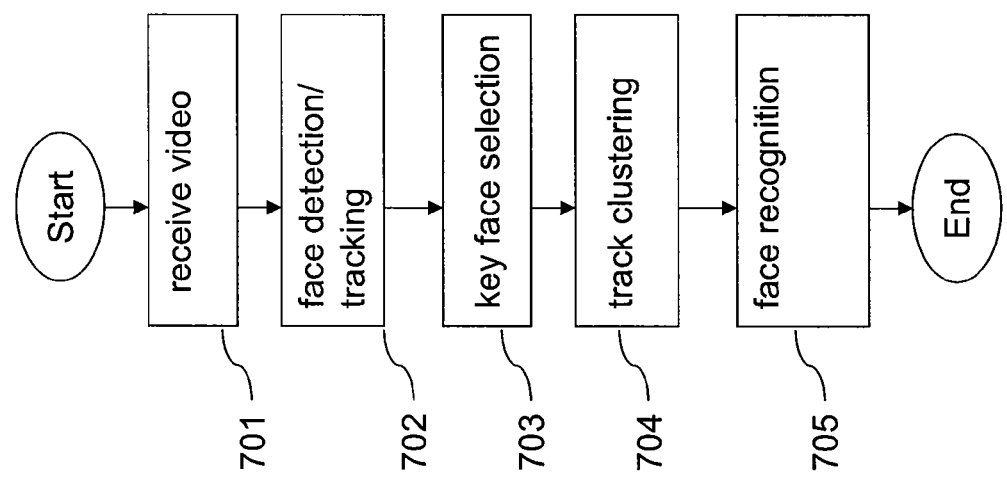
FIG. 7 shows more detailed operation of the video face recognition stage of FIG. 4, according to an embodiment of the present invention.

FIG. 7 illustrates video face recognition stage 402 in more detail, according to an embodiment of the present invention. In stage 701 video is received. Video may be received, for example and without limitation, locally, over a network, or from an external source such as a video playback device or a video recording device. The teachings of this disclosure apply to video in any video format including, for example, MPEG, AVI, QuickTime, WMV, etc. In stage 702, face detection and tracking is performed on the incoming video stream. In one embodiment of the present invention, frontal face detection based on an extension of the cascade of boosted classifiers is used. Frontal face detection using a cascade of boosted classifiers is described in P. Viola and M. Jones, "Robust real time object detection," Proceedings of the IEEE ICCV Workshop on Statistical and Computational Theories of Vision, Vancouver, Canada (July 2001).

In some embodiments of the present invention, face detection and face tracking are used alternately and periodically for each detected face. Periodically performing face detection, guided by the face tracking process, helps reduce the computational load, because face detection, in general, is computationally more intensive than face tracking. To improve the reliability of face tracking, some embodiments of the present invention can use facial feature based tracking, where a selected set of features from the feature set of each facial image is tracked. Facial feature based tracking can reliably determine whether a face can be tracked.

Figure 8:
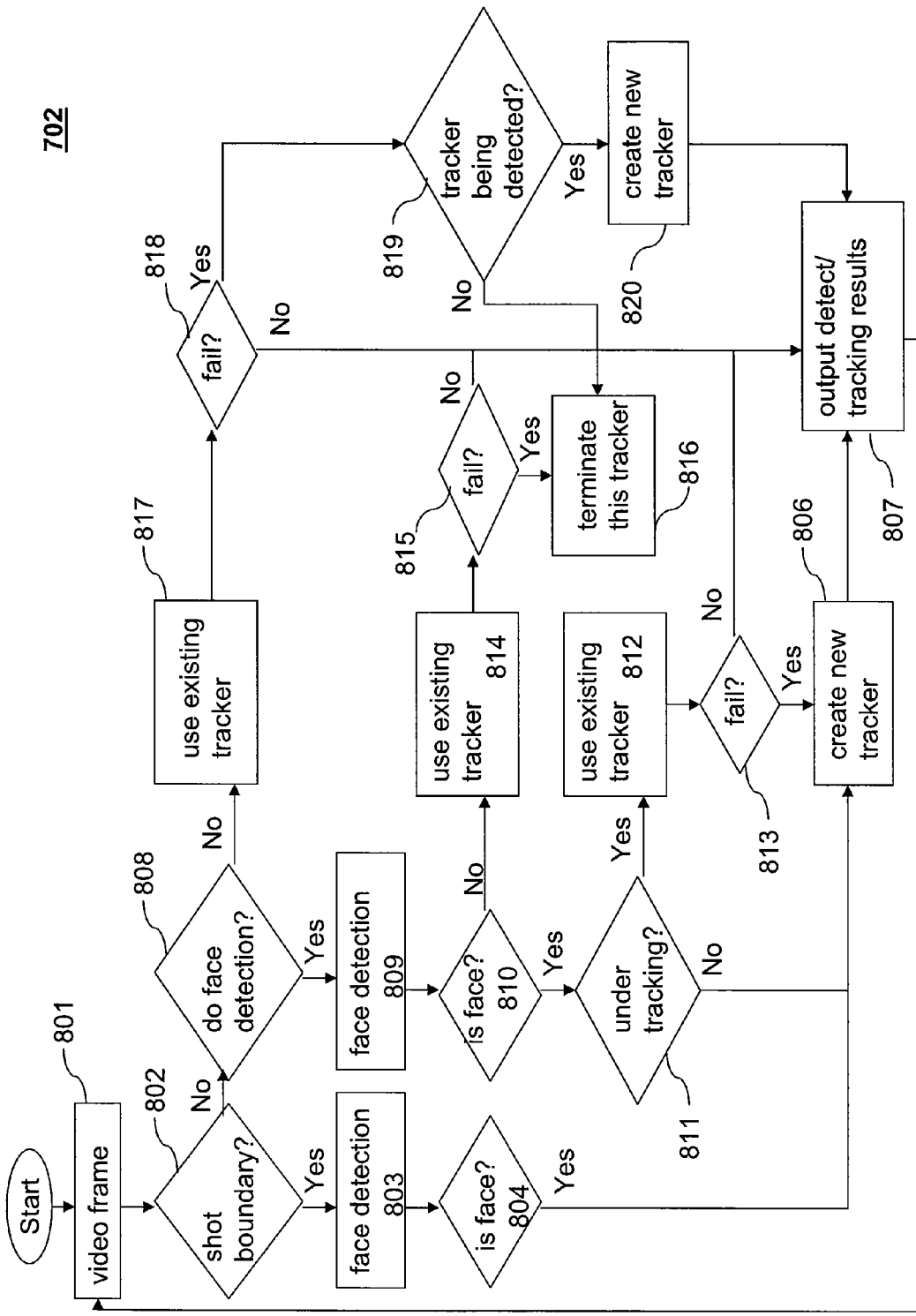
FIG. 8 is a detailed view of the operation of face detection and tracking stage of FIG. 7, according to an embodiment of the present invention.

FIG. 8 is an illustration of detailed operation of stage 702, in one embodiment of the present invention. In stage 802, each incoming video frame 801 is observed to determine whether it is a shot boundary. Shot boundary detection is used to reduce tracking across different shots. A shot is a continuous sequence of frames from one camera. There are several different types of shot boundaries or transitions between shots, for example, including cuts and fades. A cut is an abrupt shot change that occurs in a single frame. A fade is a gradual alteration in brightness usually resulting in or starting with a solid black frame. Many other types of gradual transitions are possible. Many techniques are described in the literature for shot boundary detection. If a frame is determined to be a shot boundary frame, that frame will be processed when a face detection stage 803 detects a person's face in that frame. When stage 803 is successful, then a new face feature tracker can be initiated in stage 806. A face tracker may be implemented as a separate processing thread primarily dedicated to tracking the assigned face as the video progresses. The face trackers, such as the one created in stage 806, yield output and record the tracking results in storage, such as database of face models 121.

When it is determined in step 802 that the current video frame is not a shot boundary, then stage 808 decides whether to perform face detection on the video frame. The use of face tracking is contemplated to reduce the computational load that can be caused by implementing face detection on each frame. Facial feature based tracking systems can efficiently determine whether tracking can be continued on each frame. When the decision in stage 808 is to use face detection, then face detection is initiated in stage 809. If a face is detected in stage 809, it must then be determined in stage 811 whether the detected face is currently being tracked. If the face detected in stage 809 is being currently tracked, then in stage 812 an attempt is made to reactivate an existing corresponding tracker. If it is determined in stage 813 that an existing tracker cannot be reactivated 813, then a new tracker is created and activated in stage 806. If the face detection fails in stage 809, then an attempt is made to use the existing trackers in stage 814. In stage 815, it is determined whether existing trackers are available to be used in stage 814. Each existing tracker that fails in stage 815 is terminated in stage 816.

If, in stage 808, it is determined that no face detection is necessary for the current video frame, then an attempt is made to reactivate each of the existing face trackers in stage 817. If it is determined in stage 818 that the tracker activation fails, further checks are implemented in stage 819 to determine whether the tracker can be detected. Trackers that cannot be detected in stage 819 are terminated in stage 816. Otherwise, for those trackers that can still be detected in stage 819, new trackers are created and activated in stage 820. The result received in stage 807 for each input video frame 801 can be recorded or stored for further processing.

Returning to FIG. 7, the video having been subjected to face detection and tracking, a set of representative facial images is selected for each track in stage 702. After face detection and tracking in stage 702, the faces may be represented by face tracks where each track is a sequence of faces of, in an embodiment, the same person in consecutive video frames. In considering widely available video corpora such as what is accessible in the Internet, it is often the case that the quality of the video is poor. The selection of key face images in each video track in stage 703 can substantially reduce the effects of the lower quality videos that are included in video corpus 114. A clustering-based algorithm, for example, hierarchical clustering and/or k-means clustering, can be used in selecting the set of key face images within a video track. To separate the face into clusters the distance between two images may be used. The distance between two facial images can be based on selected local Gabor features extracted from facial feature points.

After clustering, each cluster will include different faces of the same person according to pose, occlusion and quality. To reduce the noise, in some embodiments of the present invention, clusters having less than a predetermined number of facial images may be discarded. In another embodiment, clusters or facial images having non-frontal facial images can be discarded because recognition based on non-frontal faces is less reliable.

The same person can appear several times in a single video. In stage 704, inter-track clustering is implemented so that tracks having images of the same person can be considered together. In clustering tracks, the distance measure can be based on the similarity of the key faces in each track which were chosen in stage 703. For example, the distance between two clusters can be defined by the maximum similarity between a key face of a first track and a key face from the second track. A hierarchical clustering algorithm can also be used in this stage for clustering the tracks. After the intra-track clusters are clustered into inter-track clusters, further processing may be done to the set of key face images in each inter-track cluster so that unnecessary or duplicate images are discarded.

Next, processing stage 705 implements face recognition on each one of the clusters created in stage 704. In an embodiment of the present invention, a combination of a majority voting algorithm and a probabilistic voting algorithm can be used for selecting the identity of each facial image. In a majority voting algorithm the identity within the cluster that occurs most frequently is chosen. In a probabilistic voting algorithm, the confidence of the identity association is also taken into account. Therefore, in a probabilistic voting algorithm, the identity having the strongest confidence score is selected. In one embodiment of the present invention, this may be accomplished by introducing a straw-person that represents some person who does not have corresponding images in the set of face models under consideration. For example, consider each key face $f_1$ (where the set of key faces of a cluster of face tracks is $\{f_1, f_2, \ldots f_N\}$) that is recognized by the k-nearest neighbor algorithm as person $p(f_i)$ with confidence $c(f_i)$. Then for each person in all recognized persons $p_j \in \{p(f_i)\}$, the number of times the key faces are recognized as $p_j$ is $N(p_j)$, i.e., $$N(p_j) = \sum_{i=0}^{N} \partial(p(f_i), p_j)$$

where $\partial(p(f_i), p_j)$ is an indicator function that is 1 when the two arguments match, and 0 otherwise. The average recognition confidence of $p_j$ is $\overline{C}(p_j)$, i.e., $$\overline{C}(p_j) = \frac{1}{N} \sum_{i=0}^{N} \partial(p(f_i), p_j) * C(f_i)$$

The identity with the maximum $N(p_j)$ and $\overline{C}(p_j)$ can be recognized as the identity of this cluster of tracks if those parameters reach above a predetermined threshold. If the predetermined threshold is not reached, then the identity of the cluster is unknown.

Subsequent to identifying a person's face in stage 705, the associations derived previously for the corresponding face or faces can be used to annotate the video. For example, database of face models 121 may associate with each stored model a person's name and/or other information that can be used for annotating the newly processed video segment. A module such as, for example, video annotation module 109, can cooperate with video face recognition module 103 to provide annotation.

The annotated video, for example, the video stored in database of annotated video 123, can be used to provide additional information in query responses. For example, in one embodiment of the present invention, a search for a person by name can retrieve links to particular segments of the video in which the person appears or an indication of a time of appearance in a full video. In another embodiment, the stored information can be used to provide thumbnail images to accompany links provided in search responses. For example, query module 105 can cooperate with an external search application by providing matching image clips or video clips corresponding to an identified person relevant to a search query.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method of identifying faces in a video, comprising:
   (a) generating one or more face tracks from at least one input video stream;
   (b) selecting one or more key face images for each of the one or more face tracks;
   (c) clustering the one or more face tracks to generate one or more face clusters, wherein each face cluster is associated with at least one of said key face images;
   (d) creating one or more face models from respective ones of the one or more face clusters, including deriving the one or more face models directly from features of the one or more key face images associated with the respective face cluster; and
   (e) correlating at least one of said face models with a face model database.

2. The computer-implemented method of claim 1, wherein generating one or more face tracks comprises:
   (i) detecting a face in the at least one input video stream; and
   (ii) tracking the face in the at least one input video stream.

3. The computer-implemented method of claim 2, wherein the detecting and the tracking is repeated at intervals for the duration of the input video stream.

4. The computer-implemented method of claim 1, further comprising:
   (f) annotating at least one output video stream using data from the face model database.

5. The computer-implemented method of claim 4, further comprising: (i) annotating at least one face track in the at least one output video stream.

6. The computer-implemented method of claim 1, wherein the correlating includes using a majority voting algorithm to correlate the one or more face clusters to the face model database.

7. The computer-implemented method of claim 1, wherein the correlating includes using a probabilistic voting algorithm to correlate the one or more face clusters to the face model database.

8. A system for identifying faces in a video, comprising:
   (a) a face model database having face entries that include face models and corresponding names; and
   (b) a video face identifier module, comprising:
       (i) a face detection module that detects faces in an input video stream, generating one or more detected faces;
       (ii) a face tracking module that tracks at least one of the one or more detected faces and generates one or more face tracks;
       (iii) an intra-track face clustering module that generates one or more intra-track face clusters using the one or more face tracks;
       (iv) an inter-track face clustering module that generates one or more inter-track face clusters using the one or more intra-track face clusters;
       (v) a detected face model generator module that generates one or more detected face models for the one or more detected faces using the one or more inter-track face clusters, wherein the one or more face models are derived directly from features of one or more selected face images associated with the face cluster; and
       (vi) a model comparison module that compares the one or more detected face models with said face entries.

9. The system of claim 8, further comprising:
   (c) a face model generator, wherein the face model generator comprises:
       (i) a name generating module that generates a name list;
       (ii) an image searching module that locates one or more images having at least one face associated with one or more corresponding names in the name list;
       (iii) a face detection module that detects one or more target faces in the one or more images;
       (iv) a face model generation module that generates one or more face models for at least one of the one or more target faces;
       (v) a collection module that pair-wise stores the one or more face models and the one or more corresponding names; and
       (vi) a consistency learning module wherein one or more representative face models are selected from the one or more face models, and wherein the one or more representative face models are stored in the face model database.

10. The system of claim 9, wherein the name list is generated based on names in documents accessible at one or more remote locations.

11. The system of claim 10, wherein documents include news archives.

12. The system of claim 8, further comprises:
    (d) a face model update module that updates the face model database based on said detected faces.

13. The system of claim 8, wherein the face model database includes one or more entries comprising one or more face images one or more corresponding text labels wherein each entry represents one entry.

14. The system of claim 13, wherein the face model database further includes one or more entries directly input by the user, comprising one or more face images and one or more corresponding text labels.

15. The system of claim 8, wherein the face tracking module includes a facial feature based face tracker.

16. The system of claim 8, wherein the intra-track clustering includes removing noise clusters.

17. The system of claim 8, wherein the inter-track clustering includes removing noise clusters.

18. The system of claim 8, wherein the face detection module is invoked periodically and the face tracking module is invoked for faces detected by the face detection module.

19. The system of claim 8, further comprising:
    (e) a video annotation module that annotates the input video stream producing an annotated output video stream.

20. The system of claim 8, further comprising:
    (f) a query module that associates a user query with one or more entries in the face model database.

* * * * *